Feb. 16, 1960

P. F. HAYNER ET AL 2,925,228

CONDENSER WINDING MACHINE

Filed May 27, 1954

Paul F. Hayner
Sidney K. Tally
INVENTOR.

BY *Edwin A. Martin*

Attorney

Feb. 16, 1960 P. F. HAYNER ET AL 2,925,228
CONDENSER WINDING MACHINE
Filed May 27, 1954 2 Sheets-Sheet 2
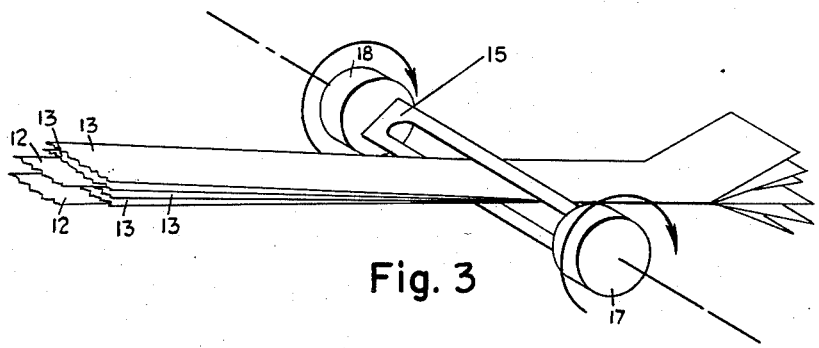
Fig. 3
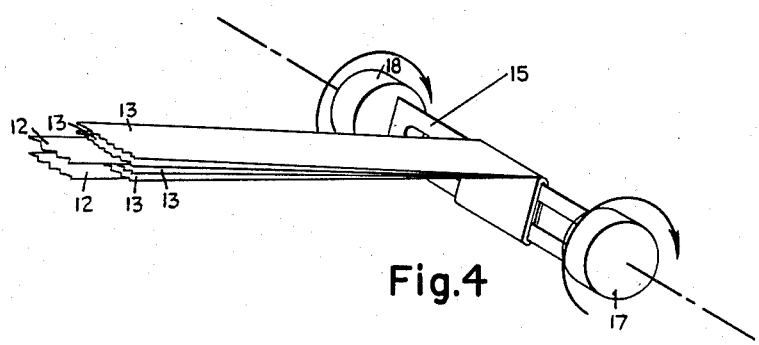
Fig. 4
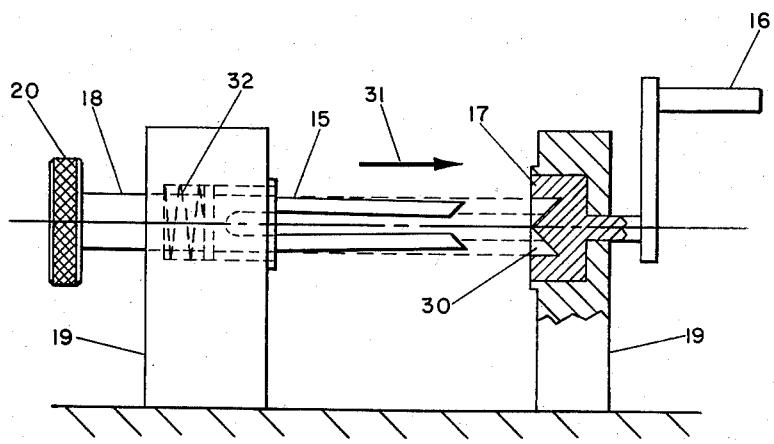
Fig. 5
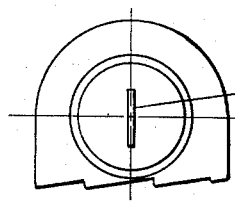
Fig. 6
Paul F. Hayner
Sidney K. Tally
INVENTOR.
BY 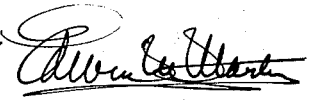
Attorney 2,925,228
Patented Feb. 16, 1960

2,925,228
CONDENSER WINDING MACHINE

Paul F. Hayner and Sidney K. Tally, Nashua, N.H., assignors, by mesne assignments, to Sanders Associates, Incorporated, Nashua, N.H., a corporation of Delaware Application May 27, 1954, Serial No. 432,880

2 Claims. (Cl. 242—56.1)

The invention relates to electric capacitors and their method of manufacture. More particularly the present invention relates to a condenser winding machine.

In the prior art many methods have been proposed for producing high quality capacitors inexpensively. In particular, it is desirable to produce capacitors permitting a wide range of capacitance values with a minimum of variation due to temperature changes. It is further desirable that the capacitors do not break down when the rated voltage is applied in the presence of relatively large temperature and humidity variations. In order to insure the production of condensers uniformly having the above characteristics it is, in addition to providing the proper conductor insulating materials, necessary to provide a machine capable of dispensing and winding these materials in the desired fashion.

It is, therefore, an object of the present invention to provide an improved machine for the manufacture of high quality capacitors.

In accordance with the present invention there is provided a condenser winding machine comprising means for dispensing alternate ribbons of foil and dielectric to be wound into condensers. The dispensing means includes a plurality of reels of the foil and dielectric ribbons. These reels are disposed in the same plane and have parallel axes. A thin, flat, elongated, fork-shaped, axially movable arbor is provided for winding the ribbons into condensers. The arbor is parallel to the axes of the ribbon reels and is disposed so as to perpendicularly intersect the plane of the reels. There is also provided a means cooperating with the arbor for collecting and positioning the ribbons before and after each winding operation. This establishes and maintains the ribbon alignment and obviates the use of guides during winding. The collecting and positioning means includes a U-shaped member rotatable about the arbor. The U-shaped member has a clamp suitably journalled for pivotal movement about an axis parallel to the base of the U-shaped member. This provides readily movable clamping jaws with surfaces always parallel to the axis of the arbor. There is also provided a means facilitating the release of the wound condensers.

For a better understanding of the present invention, together with other and further objects thereof, reference is made to the following description, taken in connection with the accompanying drawings, and its scope will be pointed out in the appended claims.

In the drawings:

Fig. 3 is a schematic illustration of the winding mechanism of the machine of Fig. 1;

Fig. 4 is another schematic illustration of the winding mechanism of the machine of Fig. 1;

Fig. 5 is an elevational view partly in section of a portion of the machine illustrated in Fig. 1; and Fig. 6 is an enlarged schematic illustration of another aspect of the machine illustrated in Fig. 1.

Figure 1:
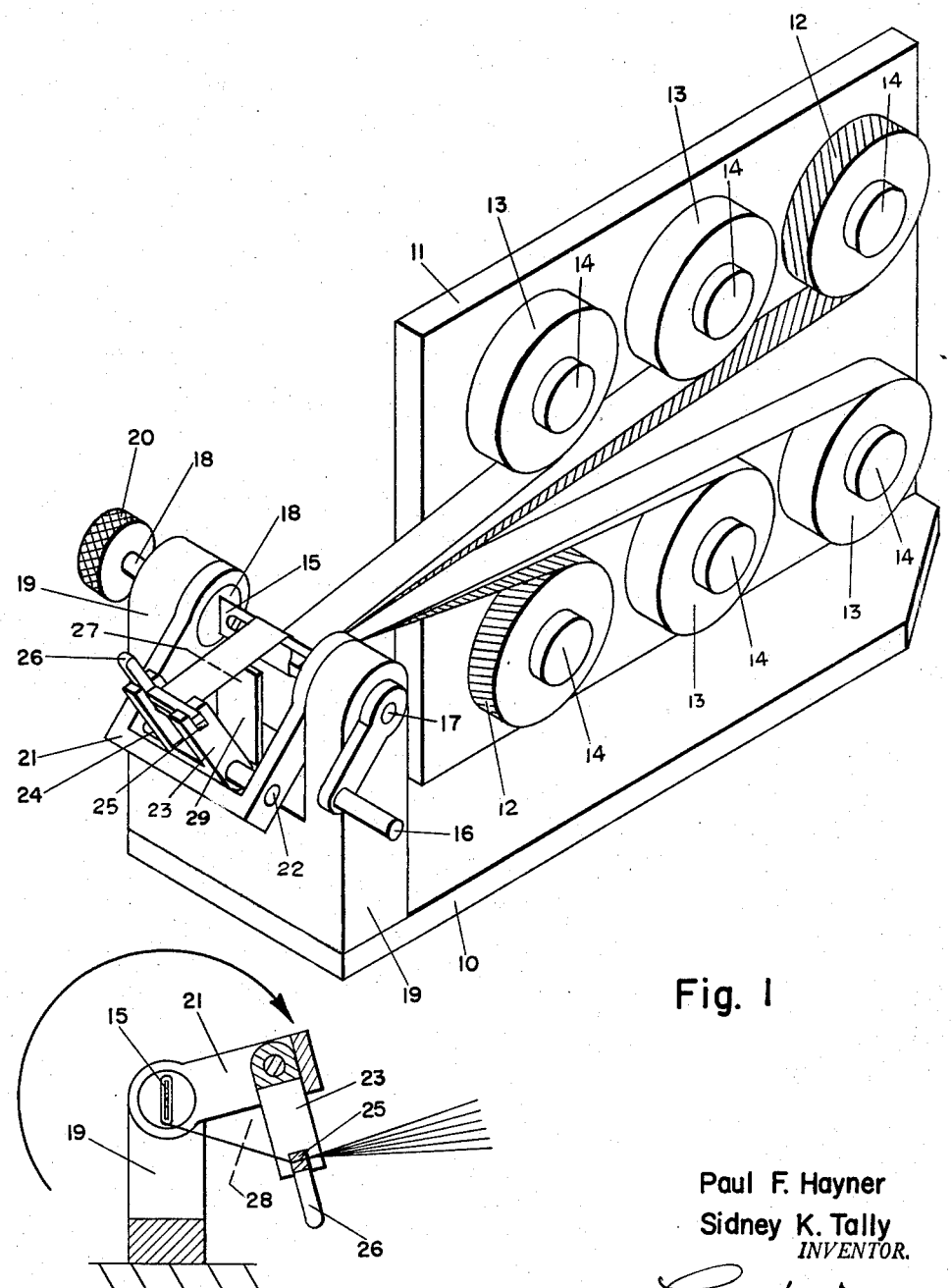
Fig. 1 is a perspective view of the condenser winding machine of the present invention.

Referring now to the drawings, and with particular reference to Fig. 1 there is here shown an embodiment of the condenser winding machine of the present invention. The machine is mounted on a base plate 10 to which is affixed a vertical plate 11 supporting rolls of foil strips 12 (shown cross-hatched) and insulating strips 13. Although any suitable dielectric material may be used, a particularly good dielectric is Mylar (trademark of the E. I. du Pont de Nemours & Company for their polyethylene-terephthalate as manufactured in accordance with U.S. Patent No. 2,465,319). The strip rolls freely rotate about and are held in position with the shafts 14 which are affixed to the plate 11. A crank 16 attached to a shaft 17 drives the fork-shaped arbor 15 as will be described below. The arbor 15 is connected to a shaft 18 and the whole is supported by a frame 19. The arbor 15 is retractable by displacing to the left (as shown) a handle 20 which is affixed to the shaft 18.

A U-shaped lever 21 is supported by and rotates about the shafts 17 and 18, as shown. A second U-shaped lever 23 is supported by the lever 21 through the connecting shafts 22 and 24, which permit the lever 23 to rotate with respect to the lever 21. A lever 26 is employed to clamp the material in place between it and a bar 25 held in position by the lever 23. A height guide 29 permits the strips to be located vertically while the arbor 15 is positioned. The apparatus as shown in Fig. 1 is in position to wind a coil in the process of fabricating a capacitor. Roughly, a turn and a half is completed to permit sufficient surface contact between the strips to prevent the material from being withdrawn from the arbor. At this time the material is cut along the line indicated at 27.

Figure 2:
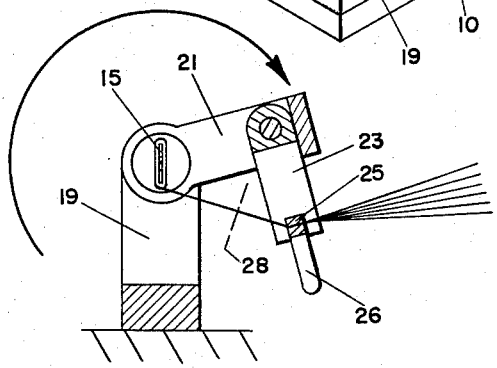
Fig. 2 is a side elevation, partly in section, of a portion of the machine of Fig. 1 illustrating an aspect of its operation.

In Fig. 2 the levers 21 and 23 are shown in position at the end of a winding. The material strips are clamped in place to permit extraction of the winding by cutting the strips along the line indicated at 28 to maintain the strips in alignment in preparation for the next winding.

Fig. 3 illustrates the insertion of the material strips between the fingers of the winding arbor 15 at the beginning of the winding. Fig. 4 illustrates the operation with several turns having been taken in the process of winding. In Fig. 5 the details of the mechanism for retracting and driving the arbor 15 are shown. The arbor 15 is shown displaced to the left to permit removal of a finished coil and the placing of the material strips in position for the start of a new winding. It is to be noted that the arbor 15 tapers inwardly when retracted and that the fingers are spread apart when introduced into the slot 30 and placed in contact with the tapered portions of the shaft 17. The arbor in the preferred embodiment is constructed of spring steel so that it resumes its tapered position when removed from the slot 30. Normally, the arbor is in contact with the shaft 17 due to the pressure exerted by the spring 32. Rotation of the arbor is effected by placing the arbor into the slot 30 formed in the shaft 17 and rotating the crank 16. The member with the slot 30 is illustrated in detail in Fig. 6. In actual practice the shafts 17 and 18 are driven synchronously. Since this practice is well known in the art, the synchronous drive system is not shown. A simple drive system comprises, for example, a drive gear or chuck affixed to the shaft 17 coupled through an idler jack shaft to a driven gear affixed to the shaft 18.

The operation of the system will be considered for the fabrication of a socalled inductive-type capacitor. The capacitor exhibits an inductive characteristic since its plates are wound in the form of a coil and will effect a measurable inductive reactance to high frequency energy.

The metallic foil strips are aligned vertically by suitably positioning the rolls 12 of foil strip. Interspaced between the two metallic foil strips are two each of the Mylar insulation strips. At the start of the winding the material is held in place as shown in Fig. 1. The lever 23 is held in its fixed position with respect to the lever 21 when the lever 21 is rotated to the position as shown in Fig. 2 after a winding is completed. The height guide 29 positions the material enabling the arbor, previously retracted, to assume the position shown and surround the material strips. As mentioned above, roughly, a turn and a half is completed to permit sufficient surface contact between the strips to prevent the material from being withdrawn from the arbor. At this time, the material is cut along the line indicated at 27. The operator completes the winding by an appropriate number of turns for the capacity desired (for example, in the preferred embodiment a 0.2 microfarad capacitor requires eighteen turns). The clamp comprising the lever 26 and bar 25 is opened and the lever 23 rotates to assume the position shown in Fig. 2. The finished winding is then cut along a dashed line indicated at 28. As the arbor 15 is displaced to the left the fingers resume their original taper to permit the removal of the flat winding. The flat winding is then placed under pressure (for example, approximately 10 pounds) directed through its short dimension and heated (for example, approximately 200 degrees C. for two hours) to seal the Mylar. The Mylar strips are so thin that pinholes ordinarily are quite common. The use of a double layer of insulation and applying heat as described insures practically complete insulation, as well as formation of an integral unit. After the coil has cooled, connecting wires are spot-welded to the individual strips of foil.

It is to be noted that no horizontal guides are required for positioning the strips of material on the arbor while winding. If the strips are displaced from the center of the arbor, several rotations of the arbor will cause them to be realigned precisely perpendicular to the arbor. This effect is due to the very careful alignment of the rolls of material in a plane perpendicular to the center of the arbor. The shafts 14, for example, are fixed in position in parallel with the arbor within a maximum displacement of a milli-radian.

In the manufacture of the non-inductive type of capacitor, the operation is essentially the same except that the metallic foil strips are displaced, as described above. When the winding is completed, the ends of the coiled foil strips extending from the opposite sides of the winding are pressed together and either soldered or welded to connecting wires.

It will be clear from the above description that the manufacture of a wide variety of capacitor values is possible with the present method. The present invention thus greatly enhances the art of manufacturing such electric capacitors.

While there has been hereinbefore described what is at present considered preferred embodiments of the invention, it will be apparent that many and various changes and modifications may be made with respect to the embodiments illustrated, without departing from the spirit of the invention. It will be understood, therefore, that all those changes and modifications as fall fairly within the scope of the present invention, as defined in the appended claims, are to be considered as a part of the present invention.

What is claimed is:

1. A condenser winding machine, comprising: means for dispensing alternate ribbons of foil and dielectric to be wound into condensers, said dispensing means including a plurality of reels of said foil and dielectric ribbons, all of said reels being disposed in the same plane and having parallel axes; a thin, flat, elongated, fork-shaped, axially movable arbor for winding said ribbons into condensers, said arbor being parallel to the axes of said ribbon reels and disposed so as perpendicularly to intersect the plane of said reels; means cooperating with said arbor for collecting and positioning said ribbons before and after each winding operation to establish and maintain the ribbon alignment and obviate the use of guides during winding, said collecting and positioning means including a U-shaped member rotatable about said arbor, said U-shaped member having a clamp suitably journalled for pivotal movement about an axis parallel to the base of said U-shaped member, thus providing readily movable clamping jaws with surfaces always parallel to the axis of said arbor; and means facilitating the release of the wound condensers.

2. A condenser winding machine, comprising: means for dispensing alternate ribbons of foil and dielectric to be wound into condensers, said dispensing means including a plurality of reels of said foil and dielectric ribbons, all of said reels being disposed in the same plane and having parallel axes; a thin, flat, elongated, fork-shaped, axially movable arbor for winding said ribbons into condensers, said arbor being parallel to the axes of said ribbon reels and disposed so as perpendicularly to intersect the plane of said reels; means cooperating with said arbor for collecting and positioning said ribbons before and after each winding operation to establish and maintain the ribbon alignment and obviate the use of guides during winding, said collecting and positioning means including a U-shaped member rotatable about said arbor, said U-shaped member having a clamp suitably journalled for pivotal movement about an axis parallel to the base of said U-shaped member, thus providing readily movable clamping jaws, with surfaces always parallel to the axis of said arbor for gripping and holding said ribbons during cutting and removal of a wound condenser, and for pulling said ribbons back over said arbor to enable said arbor to re-engage said ribbons for another winding operation; and means facilitating the release of the wound condensers, said release means including a chuck for driving said arbor during winding, said chuck having apertures therein for engaging and spreading the prongs of said fork-shaped arbor such that axial retraction of said arbor causes withdrawal of said prongs from said chuck and a subsequent restoration of said prongs to their normal distance of separation, thus disengaging said arbor from said wound condensers.

References Cited in the file of this patent

UNITED STATES PATENTS

| 288,913 | Ash et al. | Nov. 20, 1883 |
|---|---|---|
| 437,554 | Bellamy | Sept. 30, 1890 |
| 2,119,445 | Scott | May 31, 1938 |
| 2,310,071 | Frisch | Feb. 2, 1943 |
| 2,387,759 | Jarvis | Oct. 30, 1945 |
| 2,532,171 | Kaim | Nov. 28, 1950 |
| 2,627,645 | Harris | Feb. 10, 1953 |
| 2,740,592 | Larsen et al. | Apr. 3, 1956 |